July 8, 1941.   R. P. JOHNSON ET AL   2,248,630
X-RAY SCREEN
Filed May 9, 1939
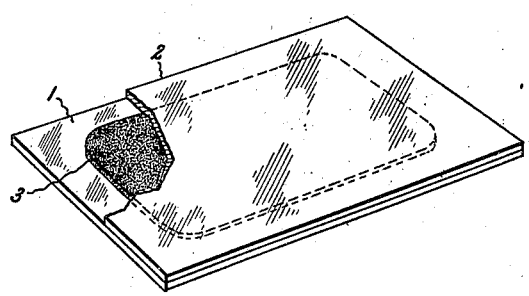
Inventors:
Ralph P. Johnson,
Frank B. Quinlan,
by Harry E. Dunham
Their Attorney.

Patented July 8, 1941

2,248,630

UNITED STATES PATENT OFFICE 2,248,630

X-RAY SCREEN

Ralph P. Johnson and Frank B. Quinlan, Schenectady, N. Y., assignors to General Electric Company, a corporation of New York Application May 9, 1939, Serial No. 272,611

7 Claims. (Cl. 250—80)

The present invention comprises improved fluorescent screens for use in radiography, for example, fluorescent intensifying screens such as are used in taking X-ray pictures, or fluoroscopic screens such as are used for visual diagnostic purposes.

It is the main object of our invention to provide fluorescent screens, hereinafter referred to as X-ray screens, which are efficient in converting X-ray energy into electromagnetic radiations within the visible and ultraviolet range, and which have a structure resulting in sharp definition when employed for making radiographic pictures.

We have discovered: first, that alkali halides, when associated with a suitable activator, are strongly fluorescent under the influence of X-rays, and second, that such halides are capable of being converted to a substantially non-granular or structureless condition when subjected to pressure. Non-granular screens give sharper definitions than screens having a granular structure.

A preferred embodiment of our invention is shown in the accompanying drawing. It comprises screens made up of paired superimposed plates or films 1, 2, (hereinafter called base and cover plates), between which is supported a binderless layer 3 of the halide fluorescent material or phosphor. The phosphor may consist of a halogen compound of an alkali metal, such as potassium or caesium, which is associated with a suitably small amount of an activator, preferably consisting of a thallium compound or metallic thallium. Conveniently, thallium chloride may be used. For example, potassium iodide may be mixed with a fractional per cent of thallium chloride. Other compounds of thallium may be used. Both salts should be ground to the state of impalpable powders. About one-half per cent of the thallium material gives good results as an activator. In some cases other activators, such as a bismuth compound, may be used.

Potassium iodide activated with thallium gives a bright blue light when excited by X-rays. In some cases it is an advantage to associate the potassium iodide with caesium chloride employing, for example, three parts of potassium iodide to one part of caesium chloride, thereby increasing the brightness of the fluorescence and shifting the wavelength of the emitted light to a higher value. This is important when the phosphor is used in an intensifying screen for it is then possible to match the peak of the emitted light with the peak of the sensitivity of the photographic emulsion. Potassium bromide and potassium chloride may be used similarly in place of caesium chloride to modify the fundamental phosphor. The ratio of 3:1 is not critical, the most suitable ratio being dependent upon the wavelength desired in the emitted light. Caesium iodide gives a strong yellow light when fluorescing under X-rays. Rubidium iodide gives a bright blue light. None of these phosphors show any noticeable amount of phosphorescence.

The phosphor mixture ground as above indicated to the form of an extremely fine powder is heated to a temperature of about 400° F. for about ten hours in order to develop fluorescent properties. Neither the temperature nor the time of heating is critical. The temperature should not be so high as to cause darkening of the phosphor.

When brought to a condition of activity the mixture is applied in the powdered state upon a suitable base, such as a sheet of the acetate or nitrate of cellulose or an ether of cellulose, or a sheet consisting of a suitable polyvinyl compound, such as polyvinyl acetal or plasticized polyvinyl chloride. Esters of acrylic acid, substituted acrylic acid, also rubber hydrochloride, and in fact any suitable inert, pressure-resisting supporting material may be used. A cover plate of such material is placed upon the coating layer and the aggregate is subjected to a sufficiently high crushing pressure, preferably at an elevated temperature, to cause the particles of powdered material to coalesce in the form of a substantially uniform non-granular layer. A pressure of approximately 15,000 pounds per square inch at a temperature of about 140 to 150° C. applied for several minutes or longer will give this desired result. Under the conditions of elevated temperature and high pressure, the base and cover plates, which preferably should be left uncoated near their margins, become firmly united or welded together. In some cases at least the phosphor becomes embedded in the base or cover elements or both, resulting in a strong, waterproof article or screen. The phosphor layer in such a screen has a translucent, colorless appearance.

The pressure treatment appears to cause a deformation or crushing of the crystal structure and the elimination of intergranular spaces without, however, destroying the fundamental molecular arrangement. It obviates a grainy appearance which is noticeable to the eye and would tend to reduce the definition of the image.

By the term "X-ray screen," we desire also to include screens responsive to cathode rays.

What we claim as new and desire to secure by Letters Patent of the United States is:

1. An X-ray fluorescent screen comprising a base consisting of pressure-resisting sheet material, a layer of phosphor thereon, and a cover therefor, said phosphor comprising alkali halide and minor proportion of an activator of fluorescence, said phosphor being coalesced to a non-granular state between said base and cover and being otherwise unassociated with bonding material.

2. A fluorescent screen comprising a layer of phosphor responsive to X-rays and cathode rays comprising a non-granular, translucent, coalesced mixture of alkali halide and an activator, said layer being resistant to a crushing force of 15,000 pounds per square inch.

3. A fluorescent screen responsive to X-rays and cathode rays comprising a mixture of potassium iodide and caesium chloride associated with activator, the crystal structure of said mixture being coalesced into a translucent, non-granular, homogeneous body.

4. The method of preparing an X-ray fluorescent screen which consists in applying in finely-divided state a heat-treated mixture of alkali halide and an activator as a substantially uniform layer between pressure-resisting sheet material and subjecting said layer to sufficiently high crushing pressure to convert the same to an effectively non-granular state.

5. The method of treating a halide phosphor responsive to X-rays which consists in applying said phosphors in finely-divided form on a supporting surface and subjecting said phosphor for at least several minutes to pressure of the order of 15,000 pounds per square inch at a temperature of about 140 to 150° C. to produce an effectively non-granular, translucent structure.

6. In a fluorescent screen a phosphor comprising alkali halide containing an activator and being pressure-coalesced to a non-granular, coherent state, said phosphor unassociated with a bonding material.

7. An X-ray screen comprising a support and a strong, binderless, non-granular layer thereon comprising alkali halide and an activator, said layer fluorescing with the substantial absence of graininess when excited by X-rays.

RALPH P. JOHNSON,
FRANK B. QUINLAN.